United States Patent [19]

Muller et al.

[11] Patent Number: 5,028,877
[45] Date of Patent: Jul. 2, 1991

[54] CIRCUIT ARRANGEMENT FOR A FAST FOURIER TRANSFORM

[75] Inventors: Herbert Muller, Schwabach; Gerhard Wergen, Zirndorf; Klaus Geisslinger, Weissenburg, all of Fed. Rep. of Germany

[73] Assignee: Diehl GmbH & Co., Fed. Rep. of Germany

[21] Appl. No.: 454,514

[22] Filed: Dec. 21, 1989

[30] Foreign Application Priority Data

Jan. 7, 1989 [DE] Fed. Rep. of Germany ....... 3900349

[51] Int. Cl.$^5$ .......................................... G06F 15/332
[52] U.S. Cl. .................................................. 364/726
[58] Field of Search ............... 364/726, 724.13, 724.17

[56] References Cited

U.S. PATENT DOCUMENTS 4,117,541 9/1978 Ali .................................... 364/726 X
4,748,579 5/1988 Zibman et al. ....................... 364/726

OTHER PUBLICATIONS

P. Ekelmann, "Transputer – richtig eingesetzt; Beispiele fur die Fourier-Transformation in OCCAM", (Electronik, vol. 4 of Feb. 22, 1985, pp. 57–62).

Primary Examiner—Gary V. Harkcom
Assistant Examiner—Tan V. Mai
Attorney, Agent, or Firm—Scully, Scott, Murphy & Presser

[57] ABSTRACT

A circuit arrangement for the implementation of a fast discrete Fourier transform in real time through the controlled operation of cross-linked butterfly, or kernel, operators. The circuit arrangement will successively transmit the two halves of a sequence of complex input words through a series-parallel input register and an interim data storage to a plurality of butterfly operators which operate in parallel, whose outputs are switchable by a multiplexer for recursive linkage with the interim storage or, in essence, for the delivery of the frequency range-output words to a parallel-series output register.

3 Claims, 1 Drawing Sheet

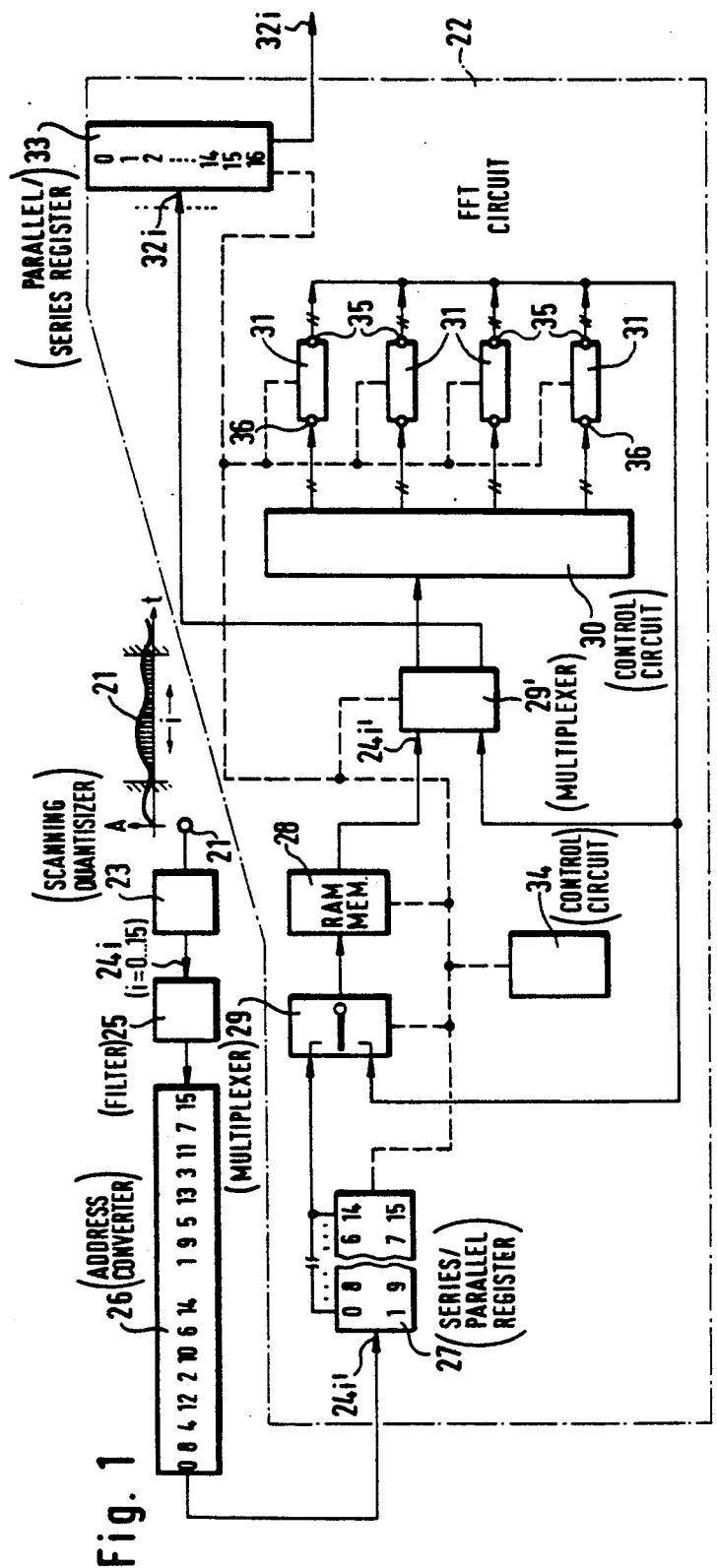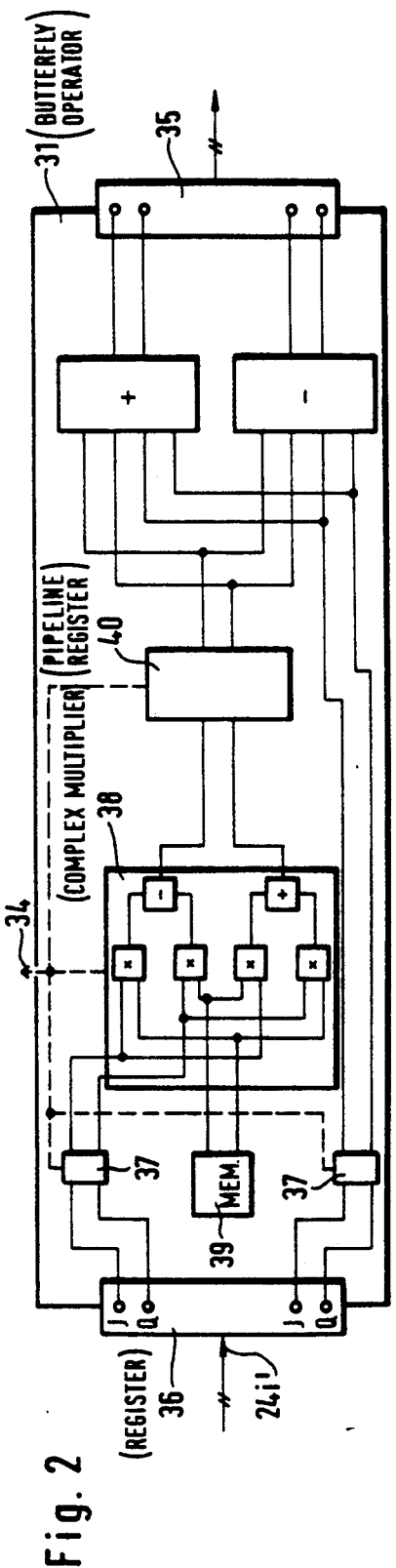
Fig. 1
Fig. 2

1

CIRCUIT ARRANGEMENT FOR A FAST FOURIER TRANSFORM

BACKGROUND OF THE INVENTION

1. Field of the Invention

The present invention relates to a circuit arrangement for the implementation of a fast discrete Fourier transform in real time through the controlled operation of cross-linked butterfly, or kernel, operators.

2. Discussion of the Prior Art

A circuit arrangement of the type which is under consideration herein is basically known from the article by P. Eckelmann "Transputer—richtig eingesetzt; Beispiele fur die Fourier-Transformation in OCCAM" (ELEKTRONIK Vol. 4 of Feb. 22, 1985, pages 57 through 62). Also known is another circuit arrangement in the embodiment of the FFT-Signal processor TMS 320.

These currently known circuit arrangements are basically programmable computers; in essence, it pertains to the fast discrete Fourier transform of universal or general-purpose circuits which are not optimized, and which must be programmed for their utilization in conformance with the extent of the transform-algorithm which is to be implemented. Due to the optimizing of such types of universal circuits predicated on the software employed, it is thusly possible to effectuate a fast Fourier transform in real time for the frequency analysis of time-dependent input signals. However, because of the structure of the computing program for the mode of operation of such computers, limits are set to the speed of computation. These limits come especially into annoying appearance when it pertains to having to transform, in real time, a large accumulation of discrete complex (in effect, consisting of real and imaginary parts) input data (so-called words); for example, such as is necessary for the signal processing of maximum frequency-radar installations for classification tasks.

SUMMARY OF THE INVENTION

In recognition of these limits of usual, available arrangements for the Fourier transform in real time, and which are predicated on considerations of contemplated utilization, the present invention consequently has as an object the provision of a circuit arrangement of the type considered herein, which allows for the realizing of an appreciable increase in the throughput of data; in effect, provides for a higher transform speed.

The foregoing object is inventively achieved in that the circuit arrangement of the type which is described herein will successively transmit the two halves of a sequence of complex input words through a series-parallel input register and an interim data storage to a plurality of butterfly operators which operate in parallel, whose outputs are switchable by a multiplexer for recursive linkage with the interim storage or, in essence, for the delivery of the frequency range-output words to a parallel-series output register.

In accordance with the foregoing, the Fourier transform in real time is effectuated in a computer circuit of parallel-operated butterfly operators, implemented as specified by the hardware, and working synchronized and recursively in the type of so-called pipelining. The complex time range-input words which are present and are already optimally grouped for the interlinked butterfly operators, are successively processed in two block halves whereby, for each block half there should be present twice as many complex input words as there are provided parallel-operating butterfly operators.

BRIEF DESCRIPTION OF THE DRAWINGS

Additional alternatives and modifications, as well as further features and advantages of the invention may now be readily ascertained from the following detailed description of an exemplary embodiment thereof which is shown limited to essentially a single-pole, single-line block circuit diagram of a generally schematically shown circuitry arrangement; in which:

FIG. 1 illustrates the parallel circuit of a plurality of butterfly operators operated recursively in pipelining mode; and FIG. 2 illustrates the circuitry of each of the butterfly operators shown in FIG. 1.

DETAILED DESCRIPTION

The time function 21, A(t) which is illustrated in FIG. 1 relates to the complex output signal of a measuring apparatus conveying, in effect, amplitude and frequency information, such as that of a radar apparatus, (referring to European Patent-OS 0251498) which, by means of the fast discrete Fourier transform, is to be converted within the frequency range. For this purpose an FFT-circuit arrangement 22 is supplied through a scanning quantisizer 23 with a sequence i of complex (in effect, J and Q-parts possessing) input words 24$i$ through a weighting filter 25 in order to compensate for the influences of errors produced through the scanning sequence-time frame (referring to Picture 3 on page 102 in ELEKTRONIK, Vol. 21 of Oct. 17, 1986). In a bit reversing-address converter 26 there is produced the word sequence 24$i'$ which is optimize d as to storage space for the operator-interlinking (refer to Picture 1a in ELEKTRONIK Vol. 21 of Oct. 17, 1986, page 102). From that word sequence there is initially loaded the first half from a series-parallel input register 27 through a multiplexer 29 into a RAM-interim storage 28. A multiplexer 29 retrieves from RAM-interim storage 28 the paired words which are to be joined together by means of a control circuit 30 which is programmed in accordance with the extent of the interlinkage of operators which is to be effectuated, in quasi-parallel into the butterfly operators 31 presently specified in conformance with their interlinking. Of the last-mentioned, half as many are provided in parallel, as there are input words 24$i'$ which are to be joined with each other. The entire sequence of input words 24$i$ which is to be subjected to the fast Fourier transform, consequently consists of four times as many values i as there are provided parallel-operating butterfly operators 31.

From the operator outputs 35 there are transcribed the (first) half of the input words 24$i$ which were previously transmitted into the interim storage 28, so as to stand available as input information for the interlinking operations which follow in the next step (pursuant to the specified cross-linkage); and so forth, until the first half of the output words 32 which are represented in the frequency level can be transmitted from the multiplexer 29$'$ into the first half of a parallel-series output register 33. Thereafter, the second half of the regrouped input words 24$i'$ can then also be loaded in the RAM interim storage 28, and in conformance with the measure of the operator-interlinking network be correspondingly treated, in order to then also to fill the output register 33 with the second half of the output words 32 which are present within the frequency range. A control circuit 34 for the sequential actuation of the registers and multiplexer as well as for the cross-linking operations is shown, for purposes of clarification, symbolically simplified in FIG. 1.

Every butterfly operator 31 possesses pursuant to FIG. 2, downstream of the input 36, a register 37 for every one of its two complex input words 24$i'$ (J/Q). One of the two complex input words is interlinked in a complex multiplier 38 with the transform coefficient which is delivered from a reference or set-value storage 39 (referring to "Basics of the FFT" in Electronic Design of May 27, 1982, page 154) and transmitted as a complex product into a pipeline register 40. While during this procedure, with the herein interim-stored product there can be effected the parallel addition-subtraction junctures of those butterfly operations with the second complex input word and then transmitted to the output 35, with the subsequent encountered input word there can already be carried out the complex multiplication which is to be implemented in the region ahead of the pipeline register 40. This facilitates the extraordinarily rapid, quasi-parallel recursive implementation of the cross-linking network of the butterfly operators 31 for the delivery of the frequency-dependent output words 32$i$ for presently one half of the time-dependent input words 24$i'$.

What is claimed is:

1. A circuit arrangement for the implementation of a fast discrete Flourier transform in real time through controlled operation of cross-linked butterfly operators, in which time-dependent input information, which has been sampled and grouped into a series of complex input words, is transmitted in a sequence of first one half of the input words and next the second half of the input words through a series-parallel input register and a multiplexer and loaded into an interim storage and then to said cross-linked butterfly operators operating in parallel, with the output words of said butterfly operators being fed through said multiplexer recrusively into said interim storage and overwriting the previous inputs for the butterfly operators until output words within a frequency range are reached, and the output words within the frequency range are fed as one half of the frequency-dependent output information into a parallel-series output register means, and then the second half of the input words is loaded into said interim storage to be directed as inputs to said cross-linked butterfly operators to repeat the processing, with the output words of said butterfly operators being fed through said multiplexer recursively into said interim storage and overwriting previous inputs for the butterfly operators until output words within a frequency range are reached and the output words within the frequency range are fed as the second half of the frequency-dependent output information into said parallel-series output register means.

2. A circuit arrangement as claimed in claim 1, wherein a complex multiplier is arranged in each said butterfly operator between a receiving register and a pipeline register for real and imaginary parts of the complex input word and a transform coefficient containing a set-value storage.

3. A circuit arrangement as claimed in claim 2, wherein the complex product from said pipeline register is additively and subtractively combined with a second complex input word, with said complex multiplier evaluating the successive first complex input word with the transform coefficient.

* * * * *

UNITED STATES PATENT AND TRADEMARK OFFICE
CERTIFICATE OF CORRECTION

PATENT NO. : 5,028,877

DATED : July 2, 1991

INVENTOR(S) : Herbert Muller, et al.

It is certified that error appears in the above-identified patent and that said Letters Patent is hereby corrected as shown below:

Column 2, line 41; "29" should read as --29'--

Column 3, lines 3-4: "multiplexer" should read as --multiplexers--

Column 3, line 30, Claim 1: "Flouier" should read as --Fourier--

Signed and Sealed this

Thirteenth Day of October, 1992

*Attest:*

DOUGLAS B. COMER

*Attesting Officer*      *Acting Commissioner of Patents and Trademarks*